(12) United States Patent
Penilla et al.

(10) Patent No.: US 10,291,566 B2
(45) Date of Patent: May 14, 2019

(54) DATA TRANSMISSION MANAGEMENT FOR COMPUTER BASED INTER-USER COMMUNICATION

(71) Applicants: Albert S. Penilla, Los Altos, CA (US); C. Douglass Thomas, Saratoga, CA (US)

(72) Inventors: Albert S. Penilla, Los Altos, CA (US); C. Douglass Thomas, Saratoga, CA (US)

(*) Notice: Subject to any disclaimer, the term of this patent is extended or adjusted under 35 U.S.C. 154(b) by 451 days.

(21) Appl. No.: 14/985,292

(22) Filed: Dec. 30, 2015

(65) Prior Publication Data

US 2016/0191444 A1 Jun. 30, 2016

Related U.S. Application Data

(60) Provisional application No. 62/115,309, filed on Feb. 12, 2015, provisional application No. 62/099,105, filed on Dec. 31, 2014.

(51) Int. Cl.
*H04W 4/12* (2009.01)
*H04L 12/58* (2006.01)

(52) U.S. Cl.
CPC ........... *H04L 51/22* (2013.01); *H04L 51/14* (2013.01); *H04L 51/26* (2013.01); *H04L 51/38* (2013.01); *H04W 4/12* (2013.01)

(58) Field of Classification Search
CPC .......... H04L 51/22; H04L 51/14; H04L 51/26
USPC ...................................................... 709/206
See application file for complete search history.

(56) References Cited

U.S. PATENT DOCUMENTS

| 8,296,380 | B1 | 10/2012 | Kelly |
| 8,359,289 | B1 | 1/2013 | Low |
| 8,972,495 | B1 | 3/2015 | Borna |
| 9,626,681 | B2 | 4/2017 | Muller |
| 10,142,274 | B2 | 11/2018 | Penilla et al. |
| 2003/0046421 | A1 | 3/2003 | Horvitz |
| 2004/0030753 | A1 | 2/2004 | Horvitz |
| 2005/0021832 | A1 | 1/2005 | Bennett |
| 2005/0055410 | A1 | 3/2005 | Landsman |
| 2006/0112166 | A1 | 5/2006 | Pettigrew |
| 2007/0064899 | A1 | 3/2007 | Boss |
| 2008/0043941 | A1 | 2/2008 | Tang |
| 2009/0037539 | A1 | 2/2009 | Postmus |
| 2009/0105377 | A1 | 4/2009 | McQuillen |
| 2009/0106365 | A1 | 4/2009 | Drory |
| 2010/0185741 | A1 | 7/2010 | Lee |

(Continued)

OTHER PUBLICATIONS

Office Action for U.S. Appl. No. 14/985,295, dated Sep. 19, 2017.

(Continued)

*Primary Examiner* — David R Lazaro
*Assistant Examiner* — Zia Khurshid

(57) ABSTRACT

Methods and systems for inter-user communication that can provide data transmission management for more efficient communications are disclosed. The methods and systems can provide enhanced electronic communications, such as via electronic mail or text messaging. Improved communication tools can be provided to better management and/or control communications. The enhanced communication tools can be implemented by electronic devices, namely, computing devices, including portable or handheld electronic devices.

20 Claims, 14 Drawing Sheets

(56) References Cited

U.S. PATENT DOCUMENTS

| | | |
|---|---|---|
| 2010/0228830 A1 | 9/2010 | Uchida |
| 2012/0030293 A1 | 2/2012 | Bobotek |
| 2012/0117161 A1* | 5/2012 | Best ................... G06Q 10/107 709/206 |
| 2012/0143972 A1* | 6/2012 | Malik ................... H04L 51/36 709/206 |
| 2012/0159514 A1 | 6/2012 | Sigalov |
| 2012/0173642 A1 | 7/2012 | Rosenberger |
| 2013/0172727 A1 | 7/2013 | Mori et al. |
| 2013/0194301 A1 | 8/2013 | Robbins |
| 2014/0089416 A1 | 3/2014 | Wang |
| 2014/0173755 A1 | 6/2014 | Wahl |
| 2015/0326510 A1 | 11/2015 | Tomlinson |
| 2016/0165040 A1 | 6/2016 | Queru |
| 2016/0191437 A1 | 6/2016 | Thomas |
| 2016/0191444 A1 | 6/2016 | Penilla et al. |
| 2016/0191453 A1 | 6/2016 | Thomas |
| 2017/0134322 A1 | 5/2017 | McQuillen |

OTHER PUBLICATIONS

Final Office Action for U.S. Appl. No. 14/985,295, dated Apr. 3, 2018.
Office Action for U.S. Appl. No. 14/985,124, dated Oct. 6, 2017.
Restriction Requirement for U.S. Appl. No. 15/041,089, dated Oct. 23, 2017.
Office Action for U.S. Appl. No. 15/041,089, dated Dec. 5, 2017.
Advisory Action for U.S. Appl. No. 14/985,295, dated Aug. 2, 2018.

* cited by examiner

US 10,291,566 B2

DATA TRANSMISSION MANAGEMENT FOR COMPUTER BASED INTER-USER COMMUNICATION

CROSS-REFERENCE TO RELATED APPLICATIONS

This application claims priority benefit of U.S. Provisional Patent Application No. 62/099,105, entitled "COMPUTER BASED USER COMMUNICATION," and filed on Dec. 31, 2014, and which is hereby incorporated herein by reference.

This application also claims priority benefit of U.S. Provisional Patent Application No. 62/115,309, entitled "MESSAGE COMMUNICATION SYSTEMS AND APPLICATIONS WITH MESSAGE LIFETIME SETTINGS FOR AUTOMATIC MESSAGE DELETION," and filed on Feb. 12, 2015, and which is hereby incorporated herein by reference.

BACKGROUND

Today, it is popular for people to text message or chat amongst one another. Text messages can be sent by various means, such as Short Message Service (SMS) or dedicated application programs (e.g., instant messaging applications). Examples of dedicated application programs include Whatsapp, Snapchat, Google Talk, ChatOn, and Facebook Messenger. Also, it is popular for people to also communicate by electronic mail (email), phone or video calls, using mobile telephones or computers. Mobile telephones enable communication by electronic mail, text messages or voice calls. One example of a VoIP-based phone application is Skype.

As communication options keep expanding, users will necessarily be required to manage multiple accounts for receiving communications. In some cases, users are forced to manage multiple accounts to keep personal and business communications separate. Although expanding the communications options for users is a benefit in terms of expanding the user's communication reach, users are currently challenged to keep up with the volume and intensity of received messages. This challenge is in part due to the vast amounts of social and work related demands on a user's time.

There remains a need for improved approaches to enable users to more efficiently manage communications, such as responses to communication requests, between one or more communication modes.

SUMMARY

The invention pertains to methods and systems for inter-user communication that can provide data transmission management for more efficient communications. The methods and systems can provide enhanced electronic communications, such as via electronic mail or text messaging. Improved communication tools are provided to better management and/or control communications. The enhanced communication tools can be implemented by electronic devices, namely, computing devices, including portable or handheld electronic devices.

The invention may be implemented in numerous ways, including, but not limited to, as a method, system, device, or apparatus (including computer program code). Several embodiments of the invention are discussed below.

As a computer-implemented method for summarizing text messages, one embodiment can, for example, include at least: receiving a series of text messages from a given sender over a period of time; determining whether the text messages in the series of text messages have not been read; and replacing the series of text messages with a summary message if the determining determines that the text messages in the series of text messages have not been read.

As a computer readable medium including at least computer program code for summarizing text messages, one embodiment can, for example, include at least: computer program code for receiving a series of text messages from a given sender over a period of time; computer program code for determining whether the text messages in the series of text messages have not been read; and computer program code for replacing the series of text messages with a summary message if the determining determines that the text messages in the series of text messages have not been read.

As a mobile computing device capable of supporting text message communications, one embodiment can, for example, include at least a memory configured to store computer program code, a processor operable to execute the computer program code, and a display. The computer program code including at least: computer program code for receiving a series of text messages from a given sender over a period of time; computer program code for determining whether the text messages in the series of text messages have not been read; and computer program code for replacing the series of text messages with a summary message if the determining determines that the text messages in the series of text messages have not been read. The display can present the text messages and/or the summary message.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Figure 1:
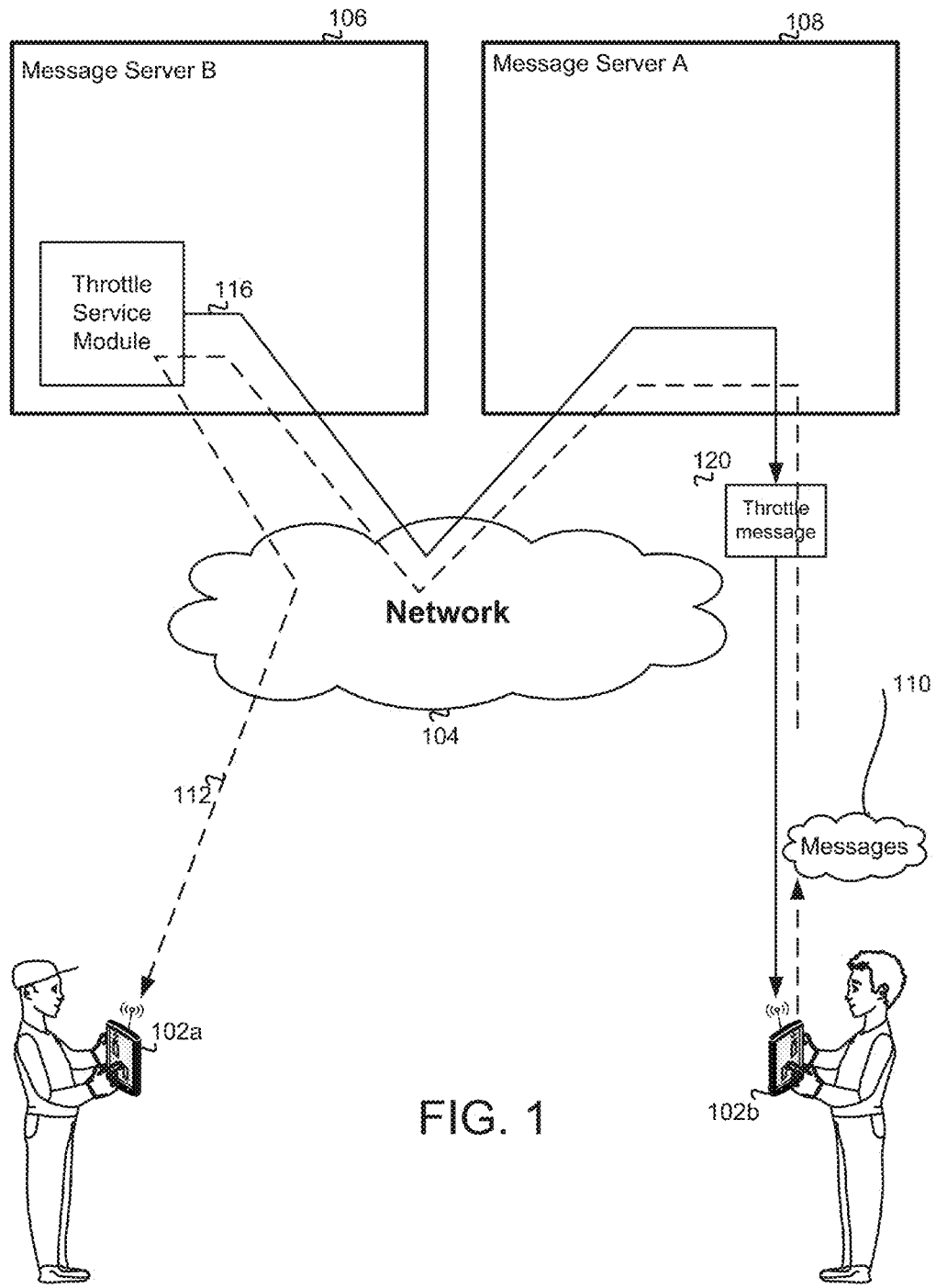
FIG. 1 is a system diagram of an inter-user communication system that exchanges messages (i.e., electronic messages) between users according to one embodiment.

The invention pertains to methods and systems for inter-user communication that can provide data transmission management for more efficient communications. The methods and systems can provide enhanced electronic communications, such as via electronic mail or text messaging. Improved communication tools can be provided to better manage and/or control communications.

The various aspects, features, embodiments or implementations of the invention described herein can be used alone or in various combinations.

Embodiments of various aspects of the invention are discussed below with reference to figures. However, those skilled in the art will readily appreciate that the detailed description given herein with respect to these figures is for explanatory purposes as the invention extends beyond these limited embodiments.

One aspect of one or more embodiments of the invention pertains to a throttling action that can control communications.

A throttle serves as a way to limit or compact communications with respect to one or more users. The communications can, for example, be text messages, e-mail messages, or telephone calls. The throttle can limit communications in any of a variety of different ways. For example, one type of throttle can impose a limit on the number of messages per unit time. Another type of throttle can impose a size limit on messages. Another type of throttle can impose limitations dependent upon the time of day or location of recipient and/or sender of messages. Another type of throttle can be dependent on status of either sender or recipient. Still another type of throttle can be based on the social connection status of the sender with respect to the recipient (e.g., friends, important friend, less important friend, a friend of a friend, etc.). Further, types of throttles can be set by a user, e.g., such as by selecting an action to take with respect to a sender of a message, and/or setting rules for actions to take with respect to messages received from a particular sender or senders. In some embodiments, the rules can process or depend on one or more conditions that can direct when particular actions to impose throttle actions are to be applied. The conditions can be temporal (e.g., different actions for different times of day and/or days of the week), or based on a number of messages received, or based on the context of the message itself (e.g., urgency expressed by the sender in the message data), or based on relationship status of the sender to the receiving user, or combinations thereof. In one embodiment, throttle(s) that implement the rules and process the conditions can be set by the user via a user interface provided by a communications application. The processing of logic to implement the conditions can be executed by a processor of the device executing the application and rendering the user interface, or can be executed by one or more servers that provide cloud processing for communications applications, or by hybrid processing that includes processing operations on the device of the user and also processing operations on a server, e.g., via an application (app) having access to the Internet. Any of these different types of throttles can be used separately or in any combinations.

As one example, in the case of a recipient user and the sender user both being at their workplace, while sending messages, the communication applications being utilized by the sender and recipient can impose a throttle such that the sender and recipient users (which might modify their behavior) are managed to limit communications while at work (though such restrictions could be relaxed if, on break or lunch).

One example of a throttle is a limit type throttle in which the number of messages in a given amount of time is limited. For example, a limit type throttle might impose a limit of one text message per every five (5) minutes. The sender attempting to send a message, in violation of the limit type throttle, could be provided with a notification. The notification can notify the sender that the text message they are attempting to send is in violation of the limit type throttle and thus will not be sent or will be sent after the imposed throttle expires or is removed. That is, the limit type throttle can be configured to "bounce" or "defer sending" of a message being throttled. In another example, the throttle may act to generate a notification to the sender, indicating that the message was received, but will not be presented to the recipient until a later point in time. For instance, if a sender sends more than two (2) text messages within a period time, e.g., 5 minutes, and the recipient does not reply to either text message, the throttle can notify the sender that any additional messages will be collected and queued, and not shown or presented to the recipient until a period time passes, e.g., 15 minutes, 30 minutes, an hour, two hours, or some user configurable period to time. In this manner, if the sender deemed too active in sending messages to the recipient, a throttle can be imposed on the sender. The recipient who knows this user is too active, can customized a throttle for that sender. This throttle can act to automatically send the sender a message, e.g., text, pre-recorded voice call or message, or text, noting that their first two messages were received, and their subsequent messages within a predetermined period of time, e.g., hour, will be queued and not presented to the recipient during that predetermined period of time. This throttle therefore acts to proactively encourage the active message sender to stop sending messages during the next hour or send less texts in the future, as they know they will be limited to two text messages. As noted above, throttle times and number of messages can be customized for different users.

In another embodiment, a method can be processed to examine a history of messages received from a user's contacts, which will enable the system to generate throttles or recommended throttles for the examined user contacts. In this examination, users that send frequent texts messages, frequent phone calls, etc., can be identified, and based on their historical contact patterns, the system can implement or recommend throttles for each user. In one embodiment, the system can group users into categories, e.g., based on their historical messaging activity and based on their relationship to the user and/or based on their social status or importance. For instance, if an active messaging sender is the wife of the recipient, the recommended throttle may be relaxed to allow more messages to come in and be delivered to the recipient. If the active messaging sender is an advertiser or commercial entity, those messages may be throttled more aggressively. If the active messaging sender is work partner, the system may recommend a medium level throttle.

In still other embodiments, a throttle may be moderated based on the content of the message, e.g., such as by reading the text message and identifying context (or converting voicemails to text to identify context). Generally speaking, context may define what the message relates to by analyzing key words and/or strings of words. In some cases, context may be determined by analyzing multiple messages over period of time, e.g., to determine if a conversation is ongoing. In other embodiments, the determined context may automatically suggest to the user to change the throttle of the message or groups of messages, e.g., while a conversation is ongoing or the conversation relates to a topic that may be important or of relative importance to the recipient user.

In still other embodiments, a throttle being imposed can be overridden. For example, use of a code word or expression of urgency might wholly or partially override a throttle.

As another example, a throttle can be a time of day type throttle in which messages are limited or blocked/prevented based on the time of day at which a message is attempted to be sent. One attempting to send a message in violation of the time of day type throttle can be provided with the notification that the message is not permitted to be sent or will be deferred until sending is permitted.

In one embodiment, a time of day can be compared to a calendar of the recipient. If the calendar indicates that the recipient is currently in a meeting, is on vacation, is working out, is traveling, etc., the system may use this information to customize a notification response to a throttle. In some embodiments, to some senders, the system will provide more detail obtained from the calendar, e.g., the type of meeting the user is currently tied up in and/or the people with which the recipient is meeting with, and/or other contextual information. For instance, if the sender is the sender's wife, the details can be more detailed and/or informative based on calendar data. If the sender is just an acquaintance or a person not currently in the recipient's contact list, the response notification can be more generic. In addition or alternatively to a calendar, in one embodiment, the recipient status can be predicted such as by location, by social media postings (e.g., check-in"), and the like.

In one embodiment, a throttle can be imposed, and/or elevated to increased throttling, in a "vacation mode." A recipient status can thus be denoted (e.g., manually by a user or automatically with reference to a calendar) as "on vacation" or the like, and such can trigger activation of a throttle or enhancing a throttle already imposed.

In some embodiments, in addition to or alternative to examining a calendar of the user, other digital sources of the user can be accessed. These digital sources can include the user's contact list, the use's online contacts, the user's friends lists from social networks, data obtained from a social network (e.g., such as the frequency of contact/messaging with the sender of the message, number of friends in common, context of communications or postings between the sender and recipient, number of "likes" posted to each other's social stream, etc.), data obtained from public or private databases, data obtained from a place of work (e.g., based on privilege access), and data generated from combining data from one or more of these digital sources. For instance, inferences can be made or validated by comparing the user's relationship as expressed in these difference digital sources. For example, the recipient's contact data may not have information that the sender is the recipient's wife, but from information obtained from a social network or posts and/or comments, it can deduced with a greater certainty score that the sender is indeed the recipient's wife. In some cases, the system may generate an inquiry message to the recipient asking "Bill, Is Jane your wife?" Still further, if the sender is identified to be a marketer (e.g., using caller ID, or by analyzing the content of the messages or both), the response can be more strict and to the point. This information, as noted above, can then be used to determine or suggest or recommend a throttle to apply to particular senders.

For purposes of one example, a notification response could display a message to the sender's device or play a recorded audio (e.g., in the recipient's voice or computer generated). One example message to the sender can be, without limitation: "Bill you have sent too many message recently, so your last message won't be delivered for 5 minutes."

In some embodiments, notification content can be customized by a user ahead of time. In other embodiments, notification content can be selected from a pre-defined list of notifications, which may insert the recipient's name (e.g., Bill), so as to appear custom. In other embodiments, recommended notifications can be suggested to the recipient, for use in regard to a given sender. For instance, if a sender sends several messages, and the recipient has not yet assigned a throttle to the sender, the system can suggest particular types of one or more throttles and/or options of responses for the sender. In other embodiments, the recipient can choose to send a response message to the sender based on availability in the recipient's calendar or other digital source. In still other embodiments, the response message can be automatically selected based on one or more determining factors, e.g., the time of day, day of the week, number of messages received, messages received over a period of time, content in the messages, context of message as determined from the message itself, importance of the sender, relationship of the sender to the recipient, and combinations thereof.

In some implementations, the user may provide a weighting as to which of the determining factors are more important. In some cases, the user may wish the calendar availability to take priority over the number of messages. In other cases, the recipient can set the system to allow unlimited messages when the calendar shows the recipient is available, but when the user is busy (e.g., booked for a meeting), the throttle can be applied. These options can be set by the user via a user interface on a communications application, or can be set periodically during use or interaction with incoming messages.

In some cases, the application and/or server can provide to the recipient suggestions on types of throttles to apply to certain senders. For instance, the system can suggest one or more custom replies. Once the throttle is set, if the throttle deems that a message will not be sent, an appropriate notification message is generated and communicated to the sender. As noted above, this processing avoids excess disturbances to the recipient. Additionally, this processing can be by a server, which can implement the throttling, can operate to avoid processing messages and sending communications that are not going to be read or are not desired by the recipient to be read, or would not be well received for one reason or another.

It is further noted that by not sending messages, or queuing messages for future sending as a group reduces computation by servers and devices. This reduction in computation can have the added technical effect of saving power at a server and/or data center resources, e.g., energy utilized to run a data center, air conditioning systems for the data center, storage, and the like.

Another example of a throttle is a content type throttle that can limit certain type or size of content. One type of content type throttle is a "no pictures" throttle. Another type of content type throttle is a "no audio" throttle. Still another type of content type throttle is a "no video" throttle. As an example of size of content, the size can be determined based on one or more multiple communications. For example, if the sender sends a series of messages, and the combined size of the content exceeds a threshold, the content type throttle can be applied. Another throttle can be to limit duration of audio or video content of messages.

Another example of a throttle is a workplace throttle. The work place throttle can operate to prevent, limit or defer communications, such as messaging, while a sender and/or recipient are at work. The determination of whether a user is at work can be based on a location of the user or can be based on a normal work schedule or based on a user setting that they are at work. One example method for identifying location of the sender and/or the recipient may be by examining the global positioning system (GPS) data of one or both devices involved in the communication. If the device is not a wireless device, Internet Protocol (IP) addresses associated with machines sending or receiving messages may be examined. In other embodiments, the content of the communications can examined to identify conversation data that identifies a place and/or location.

Another example of a throttle is a driving throttle. The driving throttle can operate automatically to prevent or defer communications while the sender or recipient are considered in a motor vehicle or, more particularly, driving a motor vehicle. Various techniques and/or devices can be used to determine when the driving throttle should be imposed, such as an accelerometer, location detector, etc.

A graphical user interface can be utilized to assist the user in setting or resetting a throttle. A throttle can be implemented to be applicable to all incoming messages or applicable to only incoming messages from certain users. The throttle can be set to be generally applicable, or can be set in accordance with a preference setting and thereafter utilized. These preference settings can be turned on and off and/or overwritten with other user selections, if desired. Additionally or alternatively, in the context of a messaging user interface, such as chat or text, messaging interface, user controls can be provided to enable a recipient user to easily impose a throttle on a specific sender user.

As mentioned above, the types of throttles can also be suggested to a recipient, based on the identity of a sender. As used herein, a throttle broadly defines what action to take in regard to a message or communication. The action taken includes, for example, whether to send and/or deliver a message to a recipient when originating from a particular sender and a particular time, or based on some limit on communications, or combinations of factors discussed in more detail above. The action taken can also be viewed to include a notification provided to the sender, e.g., notifying the sender of the action that will be taken in regard to their sent message or messages. As seen from the recipient, once a throttle is in place and active, there will be cases where messages are not received until some later point in time, and when received, maybe a group of messages are delivered at the same time. In some case, the recipient may never receive a message, if the sender is blocked and notified or just blocked. In some cases, some messages are received, e.g., one or more, and then subsequent ones are held or blocked. Further, setting the preferences can be dynamic, e.g., via the message stream or message listing. For instance, if the user is viewing messages in an inbox, an action tag can be applied (e.g., displayed) next to the message or messages to define the throttle to be applied (or available to be applied) for the sender. Further, the types of throttles to apply for particular senders can be customized, e.g., by the user or by the system based on the analysis described above.

Accordingly, setting a throttle based on a preference setting can be computer-implemented such that if the conditions associated with the preference setting are met, then the corresponding throttle can be automatically imposed. For example, a user deemed to be driving can have the driving throttle imposed on their communications. As another example, if a sender user has sent "too many" messages in a short amount of time, then a throttle can be automatically imposed. For example, the preference setting might be a limit (e.g., threshold) of (i) 2 messages in 5 minutes, (ii) more than two messages, or (iii) collective messages exceed x-bytes, etc. As another example, for a workplace throttle, the throttle can impose a limit of 5 messages per hour during working hours, unless on break.

FIG. 1 is a system diagram of an inter-user communication system 100 that exchanges messages (i.e., electronic messages) between users according to one embodiment. The inter-user communication system 100 illustrates a first user interacting with a computing device 102a, and a second user interacting with a computing device 102b. The inter-user communication system 100 can include a network 104, such as a global network, wide area network or local network, that supports data transmission. The inter-user communication system 100 also includes a message server B 106 and a message server A 108. As an example of the operation of the inter-user communication system 100, the second user can interact with the computing device 102b to prepare a message 110 that is to be sent to the first user, namely, to the computing device 102a being used by the first user. In doing so, the message server A receives the message 110 can delivers it to the message server B via the network 104. At the message server B, the message 110 can be processed by a throttle service module 112. The throttle service module 112 can determine whether the message 110 is to be presented to the first user (e.g., via the computing device 102a) or "throttled" (e.g., so as to defer such delivery). In general, the message 110 can be delivered to the computing device 102a via link 114 if the throttle service module 112 determines that a "throttle" is not being imposed on the message 110. On the other hand, if the throttle service module 112 determines that a "throttle" is being imposed on the message 110 then the delivery of the message 110 to the computing device 102a is deferred according to the throttle characteristics, and a throttle message 120 can be sent to the message server A and/or computing device 102b to advise that the message 110 (and/or the second user) is being "throttled." The nature of the throttling and its institution are described in greater detail below. Also, it should be understood that the message server A may reside on the computing device 102b or as a cloud-based or network-based resource, and that the message server B may reside on the computing device 102a or as a cloud-based or network-based resource. The message servers A and B can also be provided as a single message server.

Figure 2:
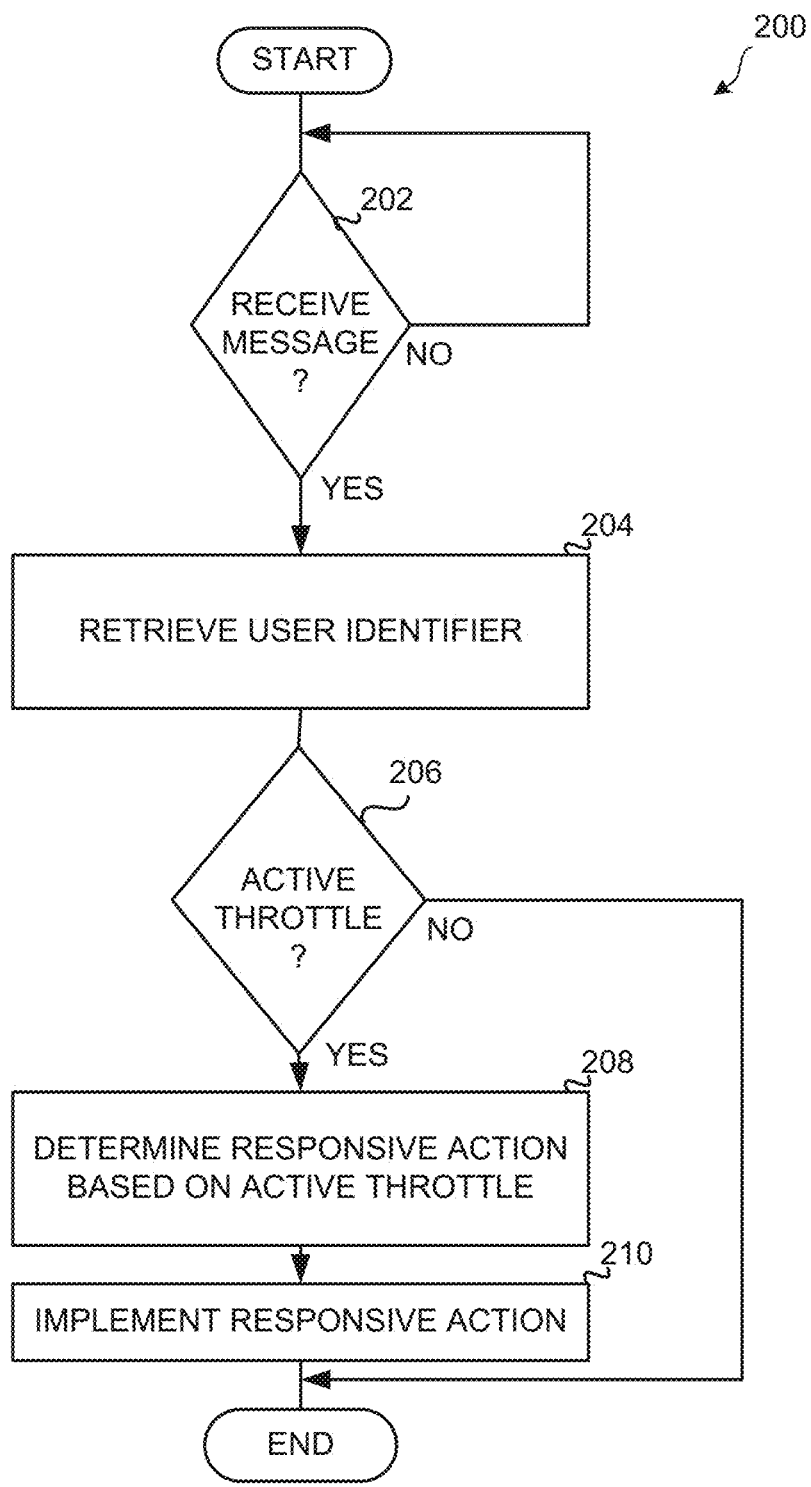
FIG. 2 is a flow diagram of a throttle process according to one embodiment.

FIG. 2 is a flow diagram of a throttle process 200 according to one embodiment. The throttle process 200 can, for example, be performed by a computing device. The computing device typically supports user communications over one or more networks in a wired and/or wireless manner. The user communications can be voice/video calls or messages. Examples of messages include email messages or text messages (i.e., instant messages, chat messages).

The throttle process 200 can begin with a decision 202 that determines whether a message has been received. In one implementation, the message, if received, is from another user that has initiated the message using a remote computing device that is able to communicate over one more networks to the computing device operating the throttle process 200. In another implementation, the message, if received, is from a user of the computing device.

When the decision 202 determines that a message has not been received, the throttle process 200 can await the receipt of an incoming message. On the other hand, when the decision 202 determines that a message has been received, a decision 206 can determine whether an active throttle exists for the user associated with the incoming chat message. When the decision 206 determines that there is an active throttle for the user associated with the incoming message, a responsive action can be determined 208 based on the active throttle. Here, the throttle process 200 can support one or more responsive actions to an active throttle. In addition, there can be one or more different types of available active throttles that can be activated or implemented for a particular user. After the responsive action has been determined 208, the responsive action can be implemented 210. There are various different responsive actions that can be implemented 210 to provide the throttling being imposed on the messages associated with the particular user. Following the block 210, the throttle process 200 can end. In addition, when the decision 206 determines that an active throttle is not presently associated with the user of the incoming message, the throttle process 200 can end.

The throttle process 200 is, for example, implemented on a computing device associated with the recipient of an incoming chat message. However, in an alternative or complementary embodiment, a throttle process (same or similar to the throttle process 200) could be implemented on a computing device associated with a sender of a message. In such case, an active throttle could have a responsive action that prevents, defers, alters or delays sending of an outgoing message. Further, in another alternative or complementary embodiment, a throttle process (same or similar to the throttle process 200) could be implemented on a computing device of a central server system, which can be remote from a computing device used by sender or receiver.

The throttle process 200 generally refers to messages. However, it should be understood that more generally the throttle process 200 can be implemented for electronic messages, such as email, chat, voicemail, VoIP, etc. The throttle process 200 is particularly well suited for text (e.g., chat) messages.

Figure 3:
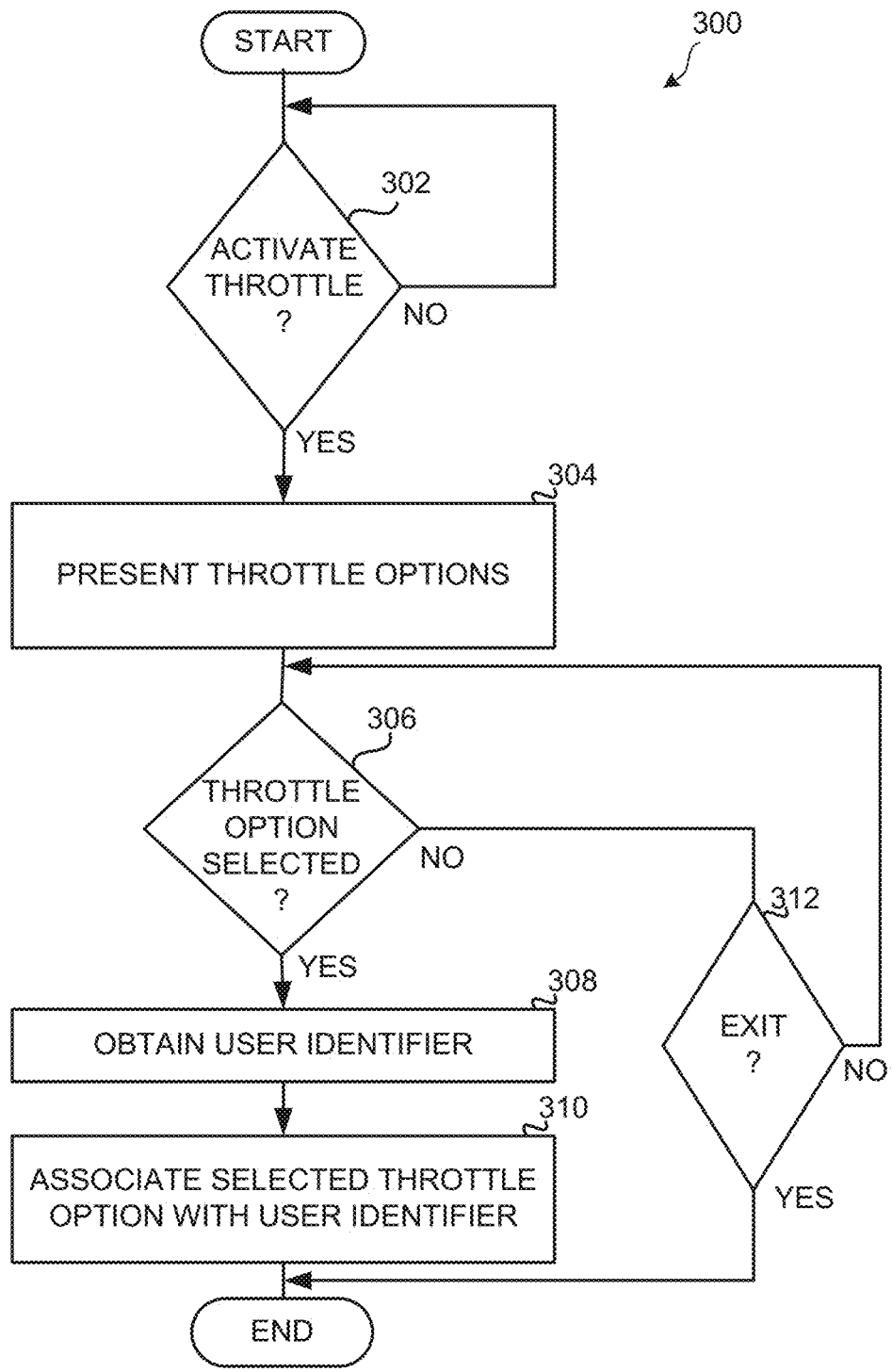
FIG. 3 is a flow diagram of a throttle activation process according to one embodiment.

FIG. 3 is a flow diagram of a throttle activation process 300 according to one embodiment. The throttle activation process 300 can be implemented on a computing device. The computing device typically supports user communications over one or more networks in a wired and/or wireless manner. The user communications can be voice/video calls or messages, email messages, or text messages (i.e., instant messages, chat messages).

The throttle activation process 300 can begin with a decision 302 that determines whether a throttle is to be activated. When the decision 302 determines that a throttle is not to be activated, the throttle activation process 300 awaits the need to activate a throttle. On the other hand, when the decision 302 determines that a throttle is to be activated, throttle options can be presented 304. For example, the throttle options that are available to be activated can be presented 304 to a user of the computing device, such as by displaying the throttle options on a display screen of the computing device. As mentioned above, the throttle options can be recommendations by the system, or can be provided from the user's custom throttles, or hybrid throttles that include messages/notifications that are user crafted or user modified.

In some embodiments, the throttles options can be implemented in response to voice commands. For instance, if the user listens to a voicemail, at the end of the voicemail the user can say "Apply throttle," and the system can provide voice read options for the user to select and apply. Accordingly, it should be understood that any input of data, selection, setting, preference, and interaction can be via voice, or combinations of voice and/or user input (e.g., text, selection boxes, touch screen inputs, gestures, etc.).

Next, a decision 306 can determine whether a throttle option has been selected. When the decision 306 determines that a throttle option has been selected, a user identifier can be obtained 308. The user identifier being obtained 308 is the user identifier that is associated with a user for which the throttle option is to be imposed. That is, the throttle to be activated is a throttle that is to be placed on the user identified by the user identifier. Thereafter, the selected throttle option can be associated 310 with the user identifier. For example, the selected throttle option can be stored in a database 511 (e.g., see FIG. 5A) in association with the user identifier, which stores an indication that the type of throttle specified by the selected throttle option is to be imposed on the user associated with the user identifier. In one embodiment, the user identifier is identified using metadata associated with the message. For instance, the message may not identify a name of the sender, but may identify a phone number. In some embodiments, open databases accessible over the Internet may be accessed to obtain additional identifying data regarding who the user is, where the message originated, or the like. The user identifier can also simply be a phone number, chat ID, a name, or combinations thereof.

Furthermore, the user identifier may be stored in a database that is separate from a database that defines the throttle to be applied or options of throttles that can be applied. In some embodiments, one or more servers can be implemented to provide the association between the user identifier and the throttle to be applied or throttles recommended (e.g., based on actions of the sender and parameters, conditions, settings or rules set by the recipient). In some embodiments, the selected throttle set for a sender having the user identifier can be processed and applied locally at the user's device. For example, the message may be received by the recipient's device, but is hidden to the recipient until the throttle logic determines that presentation (e.g., surfacing) should occur.

In such configurations, some processing can be performed on one or more remote servers connected to the Internet and some of the processing is performed locally by the device of the recipient, e.g., for implementing the throttle actions. As noted, these processes may include, for example, to determine user identifiers, identify throttles to apply, suggest throttles, modify throttles, takes the actions of the throttles, send notifications to the sender notifying of the applied throttle, save a history of applied actions based on set throttles, etc. Still further, in some configurations, throttles set for particular senders can be recommended for other senders that have similar sending or interaction profiles, e.g., number of messages, frequency of messages, length of messages, time of day sent, and/or type of content expressed in the messages. Following the block 310, the throttle activation process 300 can end.

On the other hand, when the decision 306 determines that a throttle option has not been selected, a decision 312 can determine whether the throttle activation process 300 is to be exited. If the decision 312 determines that the throttle activation process 300 is not to be exited, the throttle activation process 300 returns to repeat the decision 306 and subsequent blocks. However, if the decision 312 determines that the throttle activation process 300 is to be exited, then the throttle activation process 300 can end.

Another aspect of one or more embodiments of the invention pertains to summarizing of user communications. The summarizing can serve to condense or replace prior user communications. The summarizing can serve to provide more efficient communications when prior user communications are not able to be read in real-time, or are sent during a blocking period as set by a throttle.

It should be understood that the summarizing features are also applicable to voicemail messages, not just original text-type messages. In the case of voicemail messages, the messages can be converted to text, and if several messages repeat the same content, a new voicemail can be created which summarizes the pertinent content. Optionally, if the user wishes to listen to the original messages, an option can be provided to allow navigation to listen to such messages.

Figure 4A:
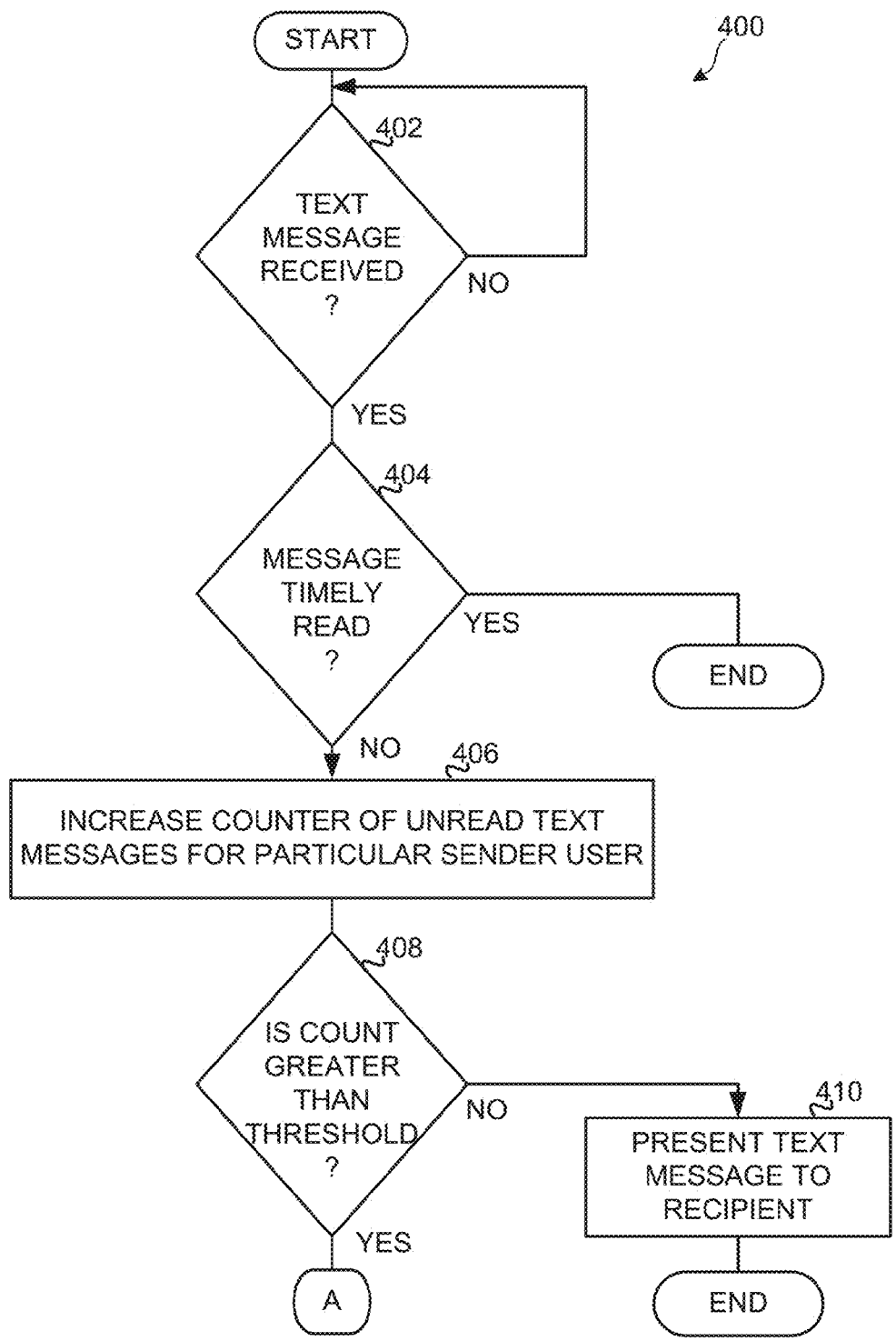
FIGS. 4A and 4B are flow diagrams of a summary message process according to one embodiment.
Figure 4B:
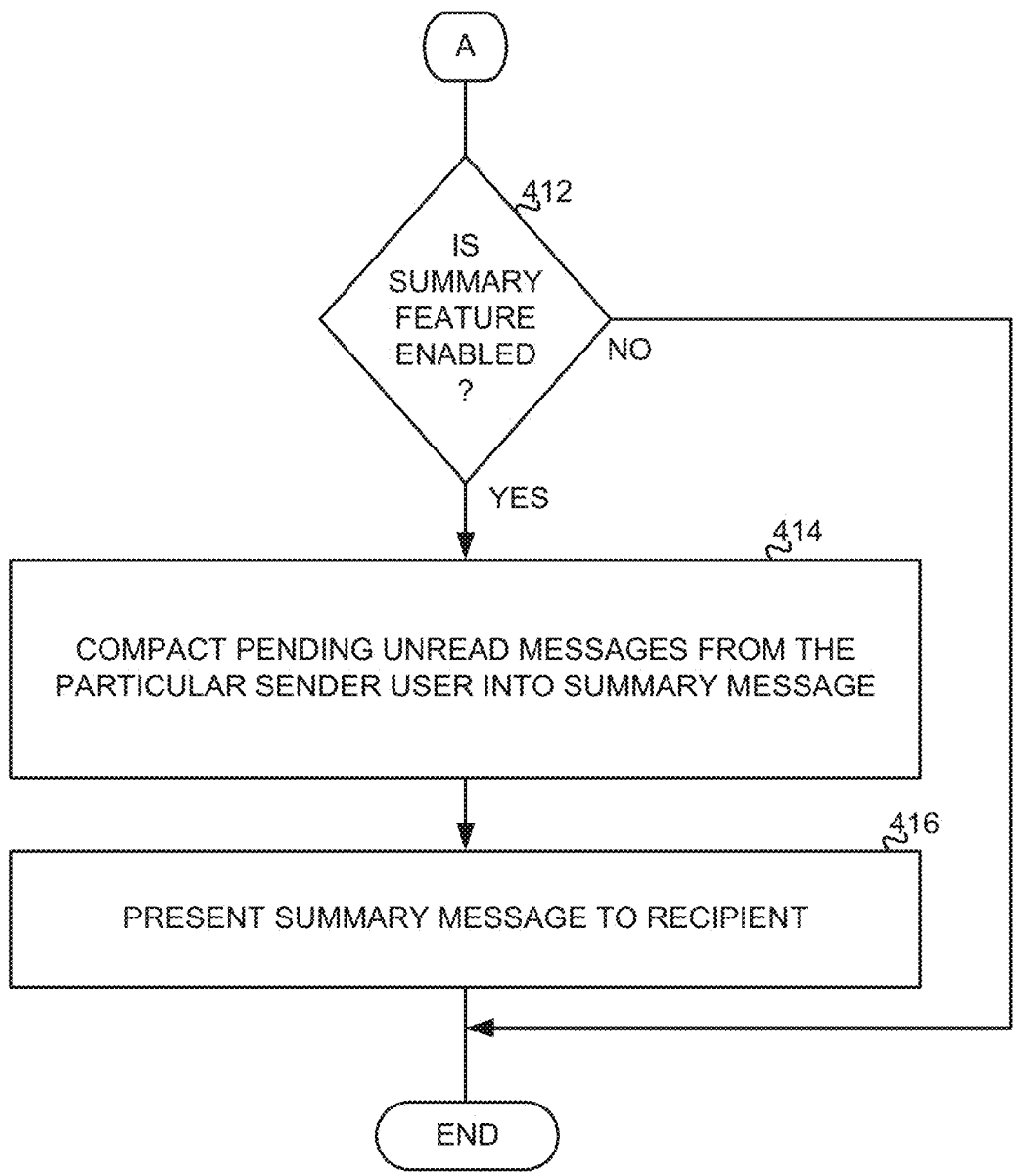

FIGS. 4A and 4B are flow diagrams of a summary message process 400 according to one embodiment. The summary message process 400 can be implemented on a computing device. The computing device typically supports electronic user communications over one or more networks in a wired and/or wireless manner. As noted above, the user communications can be voice/video messages, email messages, or text messages (i.e., instant messages, chat messages). The summary message process 400 is described further below with regard to text messages, as an exemplary type of electronic message.

The summary message process 400 can begin with a decision 402 that determines whether a text message has been received. When the decision 402 determines that a text message has not yet been received, the summary message process 400 can await receipt of a text message. Once the decision 402 determines that a text message has been received, a decision 404 can determine whether the text message has been timely read. That is, even though a text message has been received by the computing device, the user may not interact with the computing device until sometime later to actually view the text message. In some cases, the user (recipient) might never actually view the text message. When the decision 404 determines that the text message has been timely read, then the summary message process 400 can promptly end without needing to provide a summary message (at least, as to that text message).

On the other hand, when the decision 404 determines that the text message has not been timely read, a counter of unread text messages for a particular sender user can be increased 406. The counter serves as an indication of the degree to which unread text messages from the particular sender user have been received but have not been read by the recipient user. A decision 408 can then determine whether the count (provided by the counter) is greater than a threshold. The threshold is typically a predetermined threshold that identifies a number beyond which a summary message is deemed appropriate. When the decision 408 determines that the count is not greater than the threshold, then the text message can be presented 410 to the recipient. In this case, the number of unread text messages for the particular sender user has not exceeded the threshold, and, as a result, a summary message is not provided, but the text message is made available to the recipient, typically in a normal fashion. Following the block 410, the summary message process 400 can end without having produced a summary message as to at least a text message.

Alternatively, when the decision 408 determines that the count does exceed the threshold, then additional processing can be performed to produce a summary message for the recipient. In particular, the additional processing can include a decision 412 that determines whether a summary feature is enabled. Here, in one embodiment, the computing device receiving the text message can be configured to enable or disable the summary feature. When the summary feature is enabled, a summary message can be produced and made available to the recipient at appropriate times. When the feature is active, the an option can be provided to allow the user access to the original messages if desired. This may be useful in case the summary does not include certain details that are still needed. In some cases, if the original messages are not accessed for a predetermined period of time (e.g., 3 months), the original messages may be erased and removed from storage.

Still further, in one embodiment, the summary function can automatically be set based on throttle processing. For instance, if the sender has sent seven (7) short text messages over a period of 2 minutes, the throttle may prevent sending the text messages one at a time. Instead, the seven (7) short text messages are compacted into one text message. In this example, the processing may also automatically reply to the sender asking that text messages be limited or be written in a more concise. By providing the notification messages to the sender of the preferences of the recipient, it is more likely that the recipient will reply timely, and/or will not be annoyed. Furthermore, the time at which the summarized message is delivered to the recipient may be based on the throttle applied to the sender by the recipient.

As several examples of summarizing messages, see the following three texts: (a) "hey, U there?" (b) "?" (c) "dude, pls reply." Here, a logic or reasoning engine can piece together the words and attempt to make contextual sense of each text individually, and collectively in order. From (a), the system may determine that the sender is asking if the recipient is available. From (b) the system may determine that the sender is repeating a question. From (c) the system may determine that the sender wants a reply. Contextually analyzing (a)-(c) can yield a summary of "If you are available, I need your reply." In still other embodiments, the summarizing may simply combine the three text messages into one, like: "hey, U there??, dude, pls reply" In yet another embodiment, the summarizing may blend the three messages and add data known to the system, such as user names, such as: "Hey Bill, Are you available? Please reply." In other implementations, the methods of summarizing may be hybrids of those described above.

When the summary feature is not enabled, summary messages are not presented and thus the messages are simply made available to the user in a normal fashion. In one implementation, when the summary feature is enabled, then any pending unread messages from the particular sender user can be compacted 414 into a summary message. Then, the summary message can be presented 416 to the recipient. The recipient may, at that time, review the summary message or the user may review the summary message at a later point in time. Following the block 416, the summary message process 400 can end. Additionally, when the decision 412 determines that the summary feature is not enabled (i.e., when disabled), the summary message process 400 can also end without having produced a summary message.

A summary message can be generated or produced in any of a number of different ways.

One way a summary message can be generated is by automatic processing in which a set of prior unread messages from a given sender user can be compacted. For example, like messages can be compressed through elimination of substantially similar messages. As another example, messages with little or no meaningful comment can be eliminated.

Another way a summary message can be generated is by further communication with the sender user. As one example, the system can query the sender user to provide a summary, approve a summary, or influence a summary. In one particular example, the system can examine the prior unread messages from a given sender user and generate a proposed summary message, which can then be sent via text messaging, to the sender user for approval. In another particular example, the system can retrieve or retract the prior unread messages from a given sender user and ask the recipient user to return a desired summary message.

Still another way a summary message can be generated is a default message. As one example, the system can replace the prior unread message from a particular sender user with a default message. The default message can state that message(s) were received but were retracted since not read or responded to. As one example, the default message might state (in place of the prior unread messages) that "Sorry, you missed my x messages send between 5:10 pm and 7:21 pm," or "Sorry, you missed y messages sent by Bob during your 2 pm meeting."

In one embodiment, the summarizing function can implement contextual dictionaries, local dialect dictionaries, text slang dictionaries, and reasoning engines to make decisions on possible re-wording or re-statement of phrases.

Another benefit of summarizing messages is reduction of processing power by servers and devices to process inefficient messages that may not be complete thoughts or make sense if sent individually. The reduction in processing can, in some implementations, provide for substantial reductions in power utilization, storage access and transmission, etc. For example, data centers that store messages, process messages and send messages can reduce their processing bandwidth spent on small messages by throttling users that send repeated messages. In the data center, the processing of a message, even when the message is small, requires utilization of storage, processors to access storage, and database accesses so that the messages can be associated with senders and receivers. By throttling and/or summarizing, significant savings in data center processing can be achieved.

In another embodiment, messages exchanged between users can be monitored for lifetime (e.g., message lifetime). For example, a recipient can define a lifetime that defines how long the message will be saved before being deleted. When a message is deleted, the message will be deleted in the local device as well as the sending server, to eliminate a record of the message or conversation. In some embodiments, a throttle can include a condition for lifetime of a message for communication with a recipient. For example, the recipient can tag certain senders as senders for which communications should not be saved and should be deleted from the sender's records and storage, from the communicating network entity (i.e., phone company or communication provider) and from the recipient's devices and records. In one embodiment, the communicating entity can still record usage record without date and time to allow billing, but specific metadata regarding calls made at times, dates and receiving party are removed from storage and history.

To implement a lifetime for a conversation or message, in one embodiment, the recipient can set a lifetime that requests the sender to agree to a lifetime for the message or messages, which causes the sender's devices and communication services to adhere to the setting. At the same time, if the sender agrees to the lifetime, the recipient's device and services will also implement the lifetime. Once this agreement is set between the communicating parties, the parties can communicate using messages that will be expunged from all records after the lifetime expires. The lifetime can be, for instance, within a predetermined time of being received, whether read or not. Alternatively, the lifetime can be, for instance, within a predetermined period of time after being read by the recipient.

In particular embodiments, the lifetime is pre-assigned to particular recipients. If the recipients have previously agreed to the lifetime, i.e., life of message limits, subsequent communications between the users will also adhere to the lifetime. It should be understood that the lifetime can also apply to electronic messages, including voicemail messages, video chats, voice chats, text chats and email communications.

In one embodiment, email communications that adhere to a lifetime can implement an intermediary server that process the email messages between a device of the sender and a device of the recipient. For example, if a lifetime has been assigned for email communications, when an email arrives in an inbox, selection of the email can launch a window or iframe that allows reading of the email as well as composing of a response to the email. The email, in this example, is not actually delivered to the recipient's inbox, but is actually just a link to an online email client that manages the communications between the parties that agreed to the lifetime. In this example, the remotely hosted email client can hold the email, email string, email conversation, etc., for a limited period of time as set by the lifetime.

The limited period of time can be, for example, 30 minutes, 1 hour, 2 hours, 1 day, 2 days, one week, one month, etc. In some examples, either user can decide at any time to delete permanently the email or conversation of emails. In this manner, the emails are not saved in the client or the server. Further, the lifetime can be dynamically set based on identity of the sender of an email or on identity of the recipient of an email.

In further embodiments, depending on sensitivity of content discussed, a lifetime can be automatically applied. For example, if the content of an email appears to use sensitive wording or language, a lifetime can be suggested to both the sender and the recipient to agree on a lifetime. In some embodiments, a business can set rules for applying lifetime, depending on the sensitivity of the communications or the persons involved in the communications.

Figure 5A:
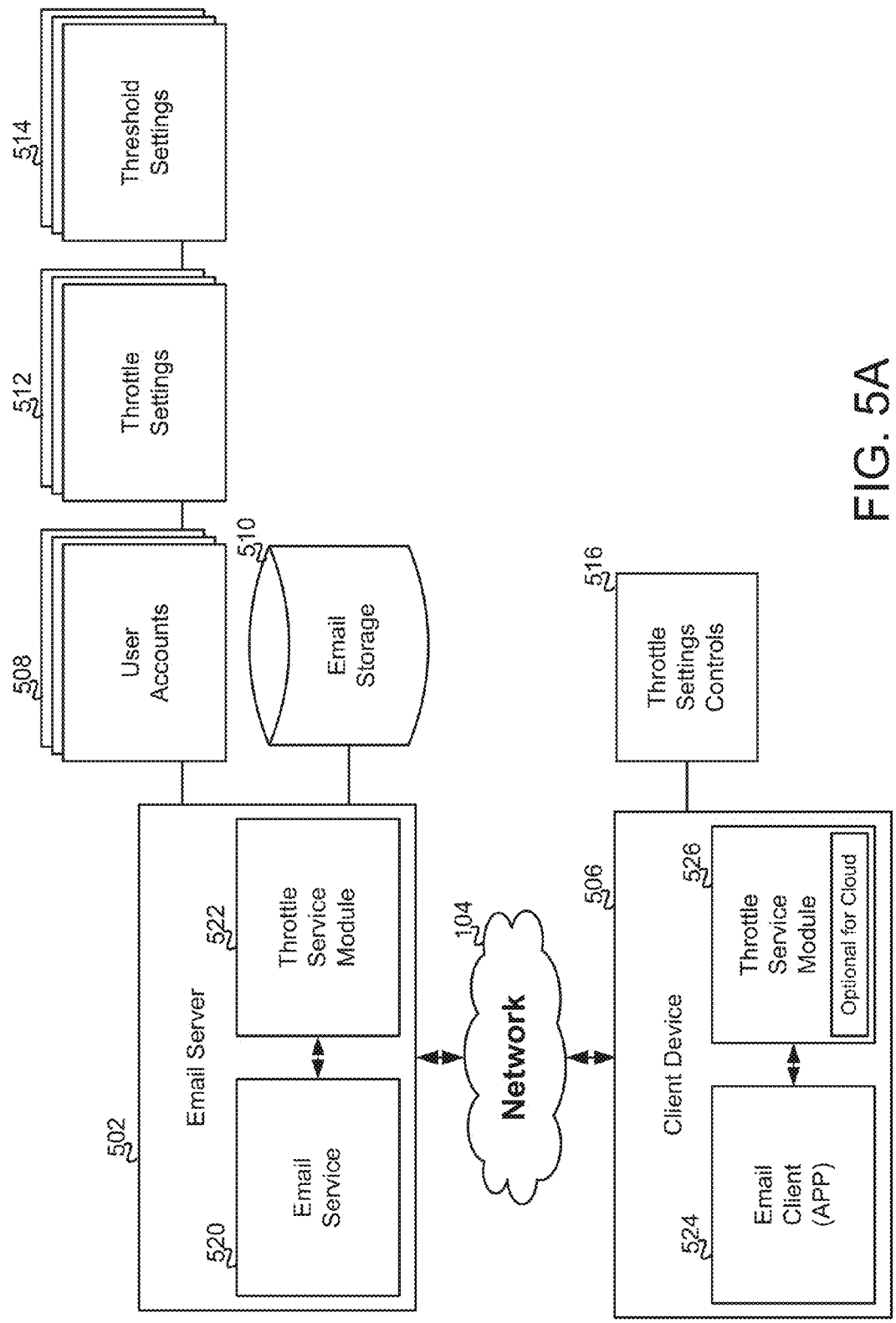
FIG. 5A illustrates a system diagram of an email server that is in communication with a client device over a network, according to one embodiment.

FIG. 5A illustrates a system diagram of an email server 502 that is in communication with a client device 506 over a network 104. The email server 502 may be a hosted server that manages email messages for various accounts, such as for the user of client device 506. In one example, the email server 502 may be a locally hosted server managed by an organization, e.g., a company for its employees. In another example, the email server 502 may be an internet hosted server that provides email services for individuals or group of individuals. In one embodiment, the email server 502 has access to storage, such as email storage 510 (e.g., used to store messages for those users of its provided services). In still another example, the email server 502 may be part of a set of servers or systems managed by an Internet company, e.g., which provide free, partially paid for, or sponsored email services. In one example, the email server 502 may be integrated with an email service 520 for processing emails, e.g., sending, replying, managing email threads, forwarding, saving, drafts, etc. In one embodiment, the email service 520 may be in communication with throttle service module 522. Throttle service module 522 may include logic and program instructions for managing the throttle operations described herein. The throttle service module 522 may be a plug-in or may be integrated into the email service 520 logic.

As shown, the client device may have its own email client 524, which may be an application (app). In another embodiment, the email client 524 may be processed entirely on the email server 502. In still other embodiments, the email client 524 provides the user interfaces for allowing the client to use email functions. In the embodiment shown, the throttle service module 526 may be executed on the client device 506. In one embodiment, the throttle service module 526 may just be executed on the email server 502. In one example, the client device 506 may be provide with a thin client for executing the email client 524 and for allowing users to interface with throttle setting controls 516. At the client device 506, the user can decide how to apply throttles to different people that may be communicating with the user. These settings are then communicated to the email server 502, which can associate the settings to the user account 508, throttle settings 512 and threshold settings 514. In one embodiment, the user accounts can be interfaced with a database 511, which may be used to save throttle options of users.

Figure 5B:
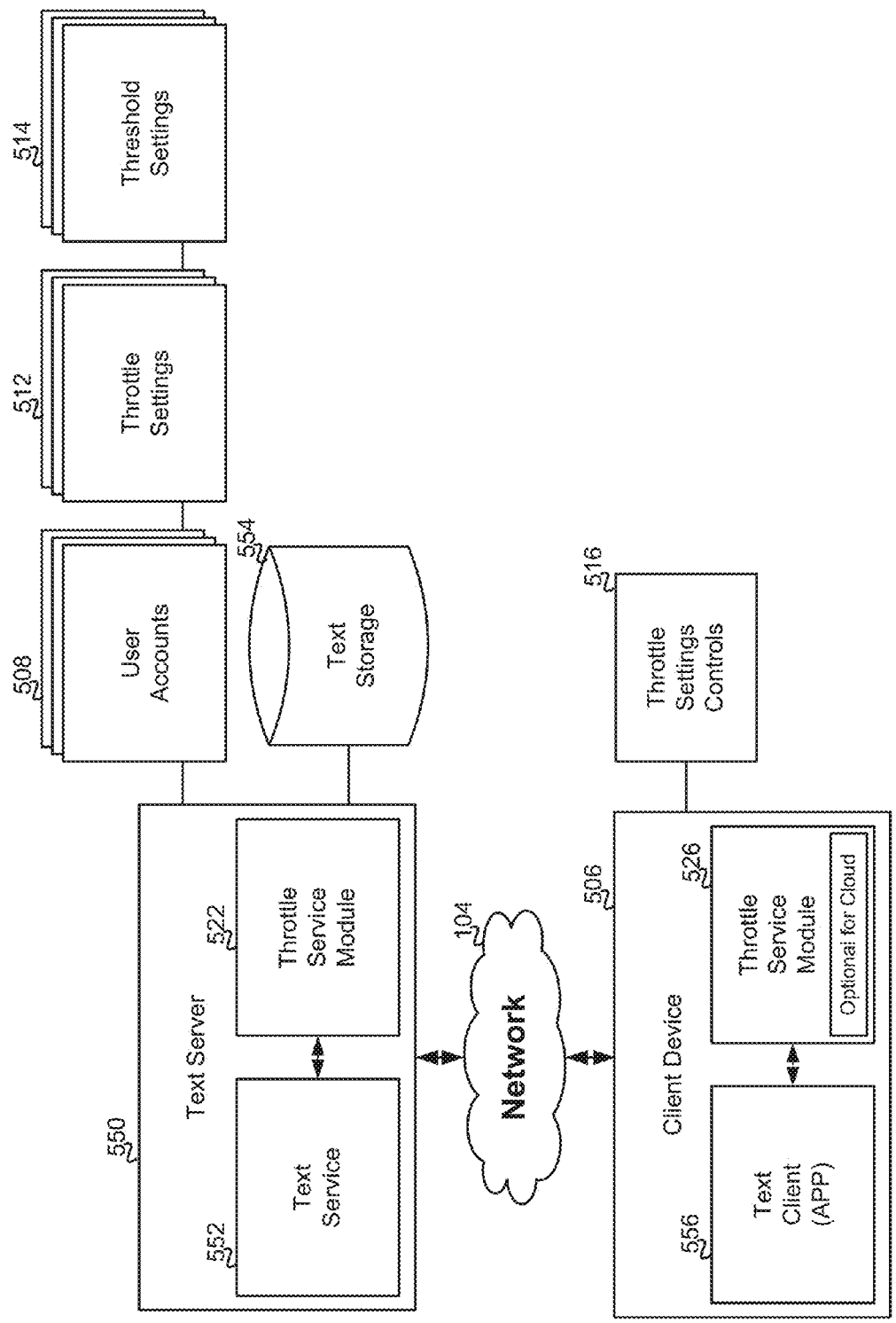
FIG. 5B illustrates an example of a text processing server.

FIG. 5B illustrates an example of a text processing server 550, which processes text service 552. Similar to the email service, the text service 552 is in communication with the throttle service module 1022. Text storage 554 is used to store texts managed by the text service 552. In this example, the client device 506 may also include a text client 556 that is provided with access to throttle service module 526.

Figure 6:
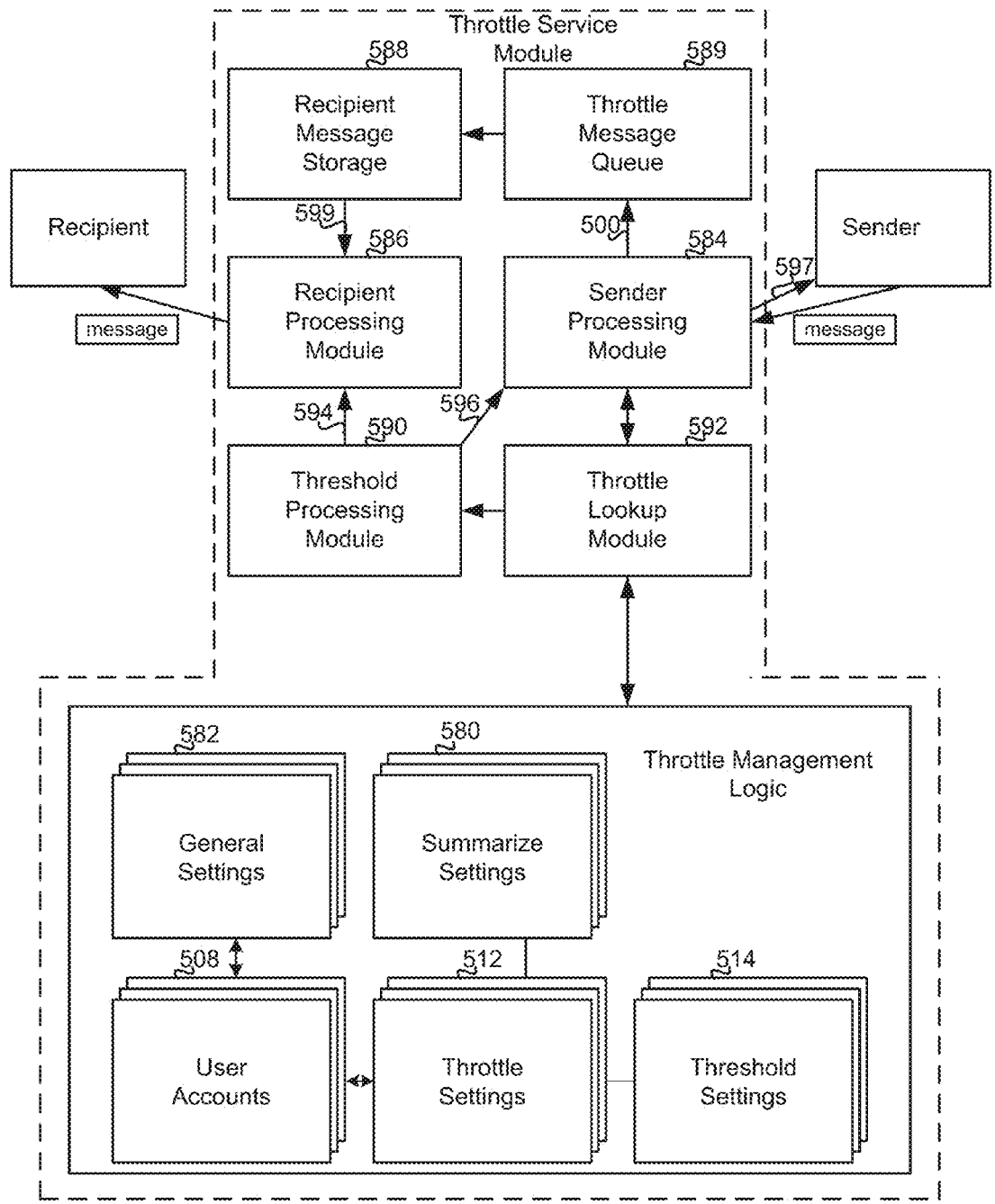
FIG. 6 is an example system diagram of the throttle service module shown in FIG. 5A.
Figure 9:
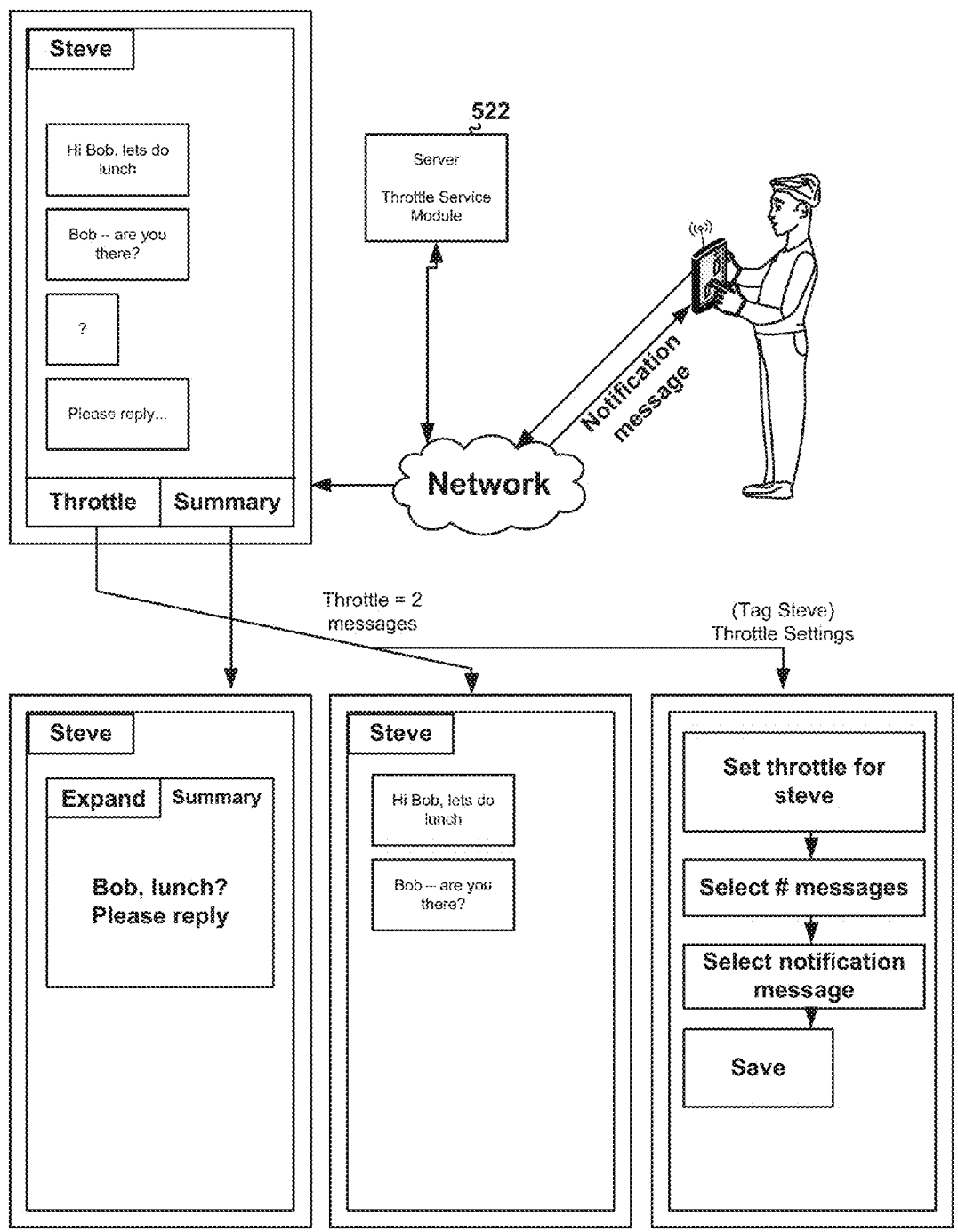
FIG. 9 provides an example of messages being summarized and messages being throttled.
Figure 10:
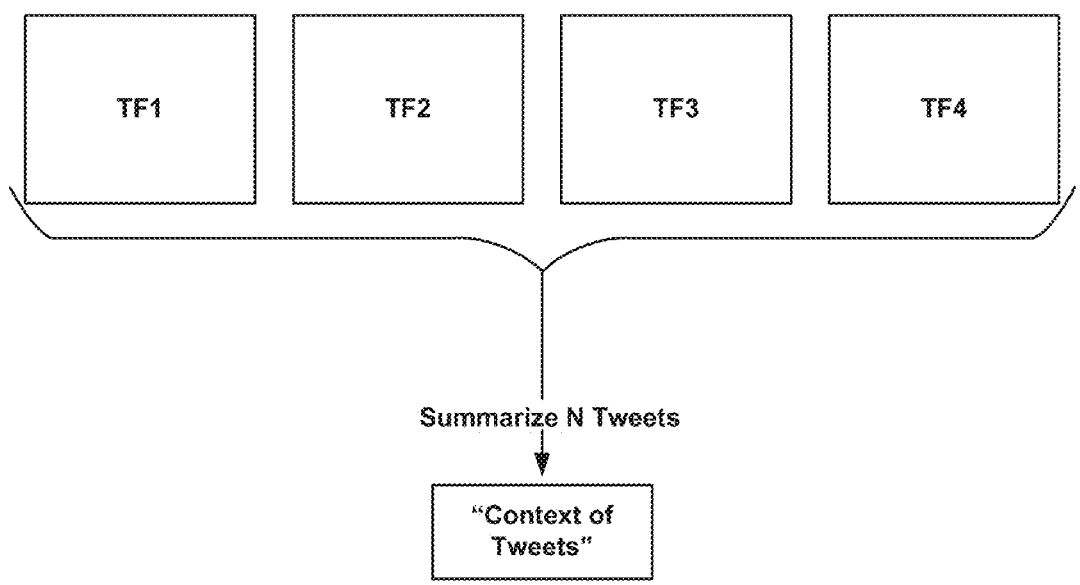
FIG. 10 is a block diagram illustrating an example of a summary feature being applicable to tweets received over a period of time or for summarizing a subset identified by the user.

FIG. 6 is an example system diagram of the throttle service module 522 shown in FIG. 5A. The throttle service module 522 includes a recipient processing module 586 and a sender processing module 584. In operation, a sender may send a message to the recipient, who may be using a system for throttling messages (e.g., email, text, voice, social, tweets, social, etc.). A message sent by sender is received by the sender processing module 584, which is in communication with a throttle lookup module 592. Throttle lookup module 592 is configured to interface with throttle management logic, which provides communication to user accounts 508, the throttle settings 512, the general settings 582, the threshold settings 514, and a summarize setting 582. FIGS. 9 and 10 provide examples of a summarize setting, such as the summarize setting 582, when executed for messages of a user, in accordance with predefined settings.

Based on the throttle settings for the sender and/or the message received, a threshold processing module 590 will process the logic associated with determining if the message should be sent to the recipient, denied, queued, or some other action is to be taken. In one example, signal 596 is sent from threshold processing module 590 to the sender processing module 584, indicating that the message should communicated 598 to the throttle message queue 589 for processing. The processing while the message is at the throttle message queue 589 can include deleting, saving a metadata, and/or saving the message to storage 588. At some later point, the message may be sent 599 to the recipient processing module 586 for processing, e.g., such as forwarding to the recipient. The forwarding would be done at a later time, e.g., after a set period of time has lapsed, after a set number of messages are accumulated, etc. In another example, the threshold processing module 590 may send a message to the recipient processing module 586 to simply send the message direction to the recipient without delay, e.g., as not throttle setting was detected or determined to be needed. As noted above, the processing logic executed by the aforementioned modules can be processed in software, in firmware, in program instructions executed with larger systems or subsystems. In some embodiments, the throttle can also act to capture spam with more fidelity, identify senders of the spam, collect spam messages for showing proof of sender, and automatically throttle certain types of messages, e.g., using learning algorithms.

Figure 7:
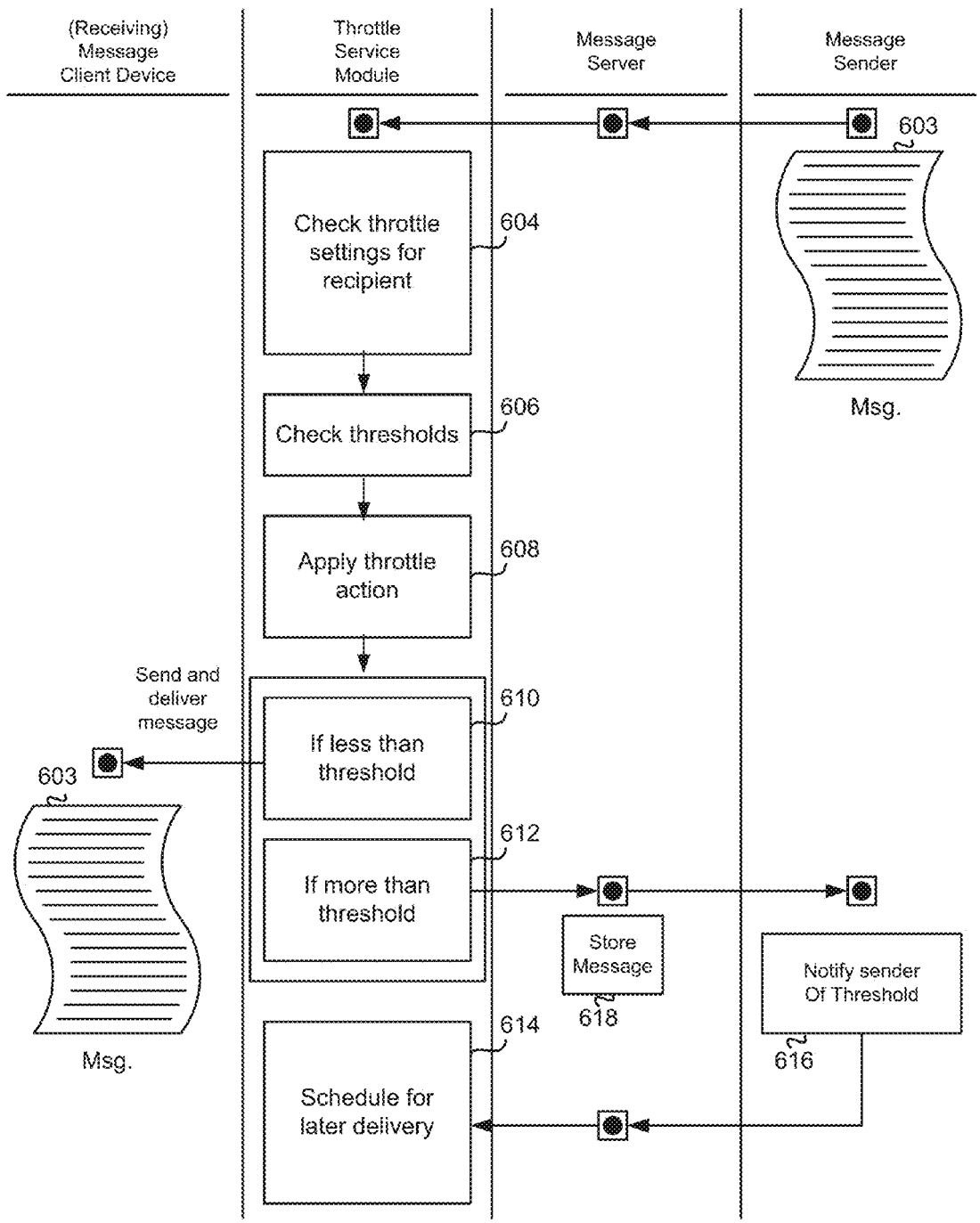
FIG. 7 illustrates an example flow diagram, showing processing by a number of systems.

FIG. 7 illustrates an example flow diagram, showing processing by a number of systems. A client device is shown in communication with a message server (e.g., message server 1102) and a throttle service module (e.g., throttle service module 1022). In this illustration, the throttle service module can cooperate to process a received message 1103. The message 603 is received at a processing node of the message server. At this point, the message and/or metadata of the message is sent to a processing node of the throttle service module. In this example, the throttle service module may check for throttle settings for the recipient in operation 604. In operation 606, the throttle service module 1022 will check for thresholds. Once the thresholds, if any are found and/or instituted, the throttle service module 1022 will apply a throttle action 608. For example, if it is determined that a value (i.e., message number, message time, message frequency, and/or combinations thereof) is less than threshold, then the message 603 is sent to the client device for presentation. If it is determined that the value is more than the threshold, then processing proceeds to the message server node where the message is saved or queued for later delivery (or deleted). In this example, the message is stored 618, and the sender is optionally provided with a notification 616, with a message indicating why the message is throttled (i.e., not being delivered or delayed). In one embodiment, the message is scheduled for later delivery 614 by throttle service module 522. As noted above, the message processing can be for email, text, voicemail, social messages, twitter messages, etc.

Figure 8:
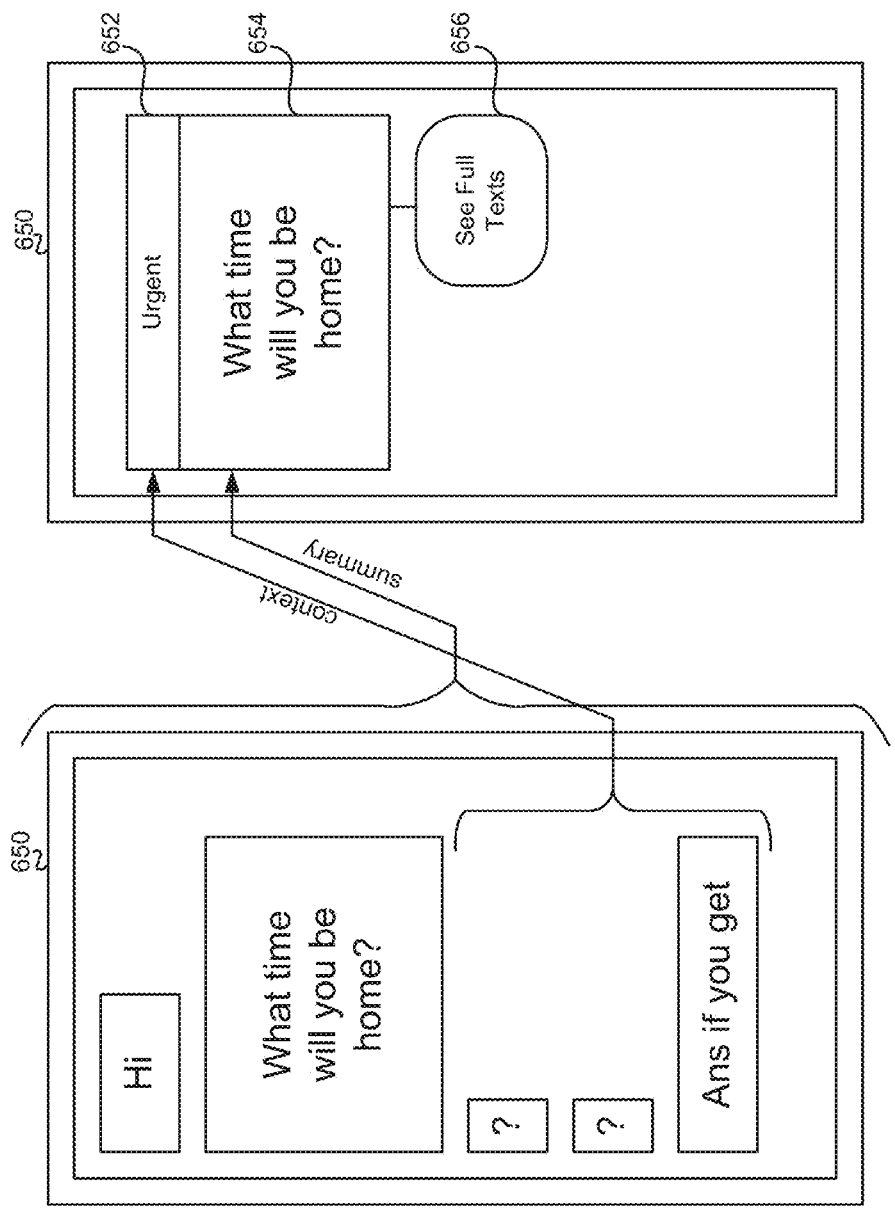
FIG. 8 illustrates an example of a device receiving several text messages from a sender.

FIG. 8 illustrates an example of a device 1050 receiving several text messages from a sender. As shown, the messages may have some context that can be determined, such as the message being urgent. The rest of the message may have a general message theme, that is distributed among various short messages. In such as case, the user may select a summary feature or a device may institute the summary feature based on conditions, status, rules, etc., which may act to generate a summary 1054. The system may also deduce that the context is "urgent" and provide a header 652 or some indicator to convey urgency, e.g., such as color, flashing, font size, etc. Although the messages can be condensed to the summary 1054 in the summarize mode, the user may also be provided with the option to see the full texts 656.

FIG. 9 provides an example of messages being summarized and messages being throttled. An example is also provided wherein a user can set throttle settings. The server throttle service module 522 can save the settings made by the various client devices that subscribe to the service. Further shown is a sender "Steve" getting a notification message, e.g., because his message or some messages were throttled (i.e., not delivered or will be delivered later).

For example, user Bob may be receiving multiple short messages from Steve, and these messages may be accumulating. These messages may be small or cryptic or use slang, which could make them difficult to understand without spending too much time scrolling up to obtain enough context to understand what the message is about.

In one example implementation, the summary feature is configured to remove unnecessary messages, identify context based on two or more of the messages, and construct a summary of the messages. In this simple example, the messages are summarized as "Bob, lunch? Please reply." If the user wishes to see the full extent of the messages that resulted in the summary, the user can be provided with the option to expand the messages back out.

If the user Bob wishes to throttle Steve, e.g., because he is getting too many messages from Steve, the user can select to throttle Steve's messages. In one configuration, user Bob may custom configure the settings for Steve, e.g., by setting throttle for Steve. In one example, the setting can be to limit the number of messages that can be received from Steve, since the last read message or over a predefined period of time. Any number can be used, but in this example, the setting was set to 2 messages. In another or additional implementation, the user can also set a notification message custom to Steve. For example, the message can be set to "Steve, please reduce the number of messages being sent, I will get back to you soon," or any other custom or user defined memo. As shown, once the throttle is set to two (2) messages, Bob will only receive two messages from Steve (in real time), and Steve will be notified of the same. This way, if Steve needs to send something important, he will limit his frequency or make more concise text messages, or take some other action.

FIG. 10 is a block diagram illustrating an example of a summary feature being applicable to tweets received over a period of time or for summarizing a subset identified by the user.

Figure 11:
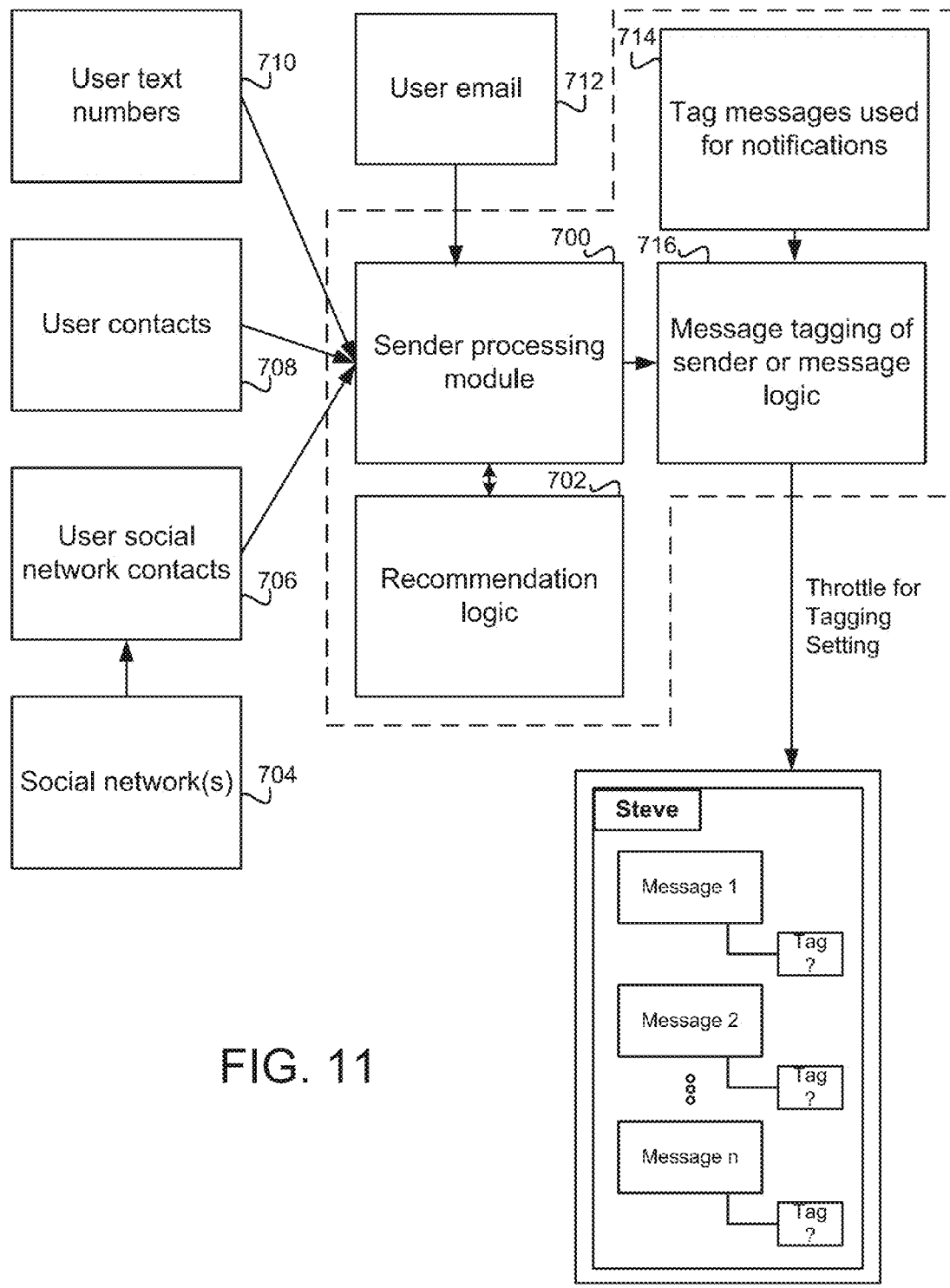
FIG. 11 illustrates an example of a sender processing module receiving data or pulling data from various sources so that throttling can be applied.

FIG. 11 illustrates an example of a sender processing module 700 (e.g., sender processing module 1086) receiving data or pulling data from various sources so that throttling can be applied. In this example, the sender processing module 700 is in communication with user text numbers 710, user email 712, user contacts 708 (local and/or on online user email/text provider systems), user social network contacts 706 via social networks 704. The sender processing module 700 can be configured interface with recommendation logic 702 for receiving recommendations as to which senders to tag (or mark) for throttling or which senders should be provided different messages. Recommendation logic 702 can also determine a best throttle among many possible throttles based on learned experiences from many users over time. The sender processing module 700 further message tagging of sender or message logic 716. The messages used for notifications 714 will also be used so that when a recommendation to tag a sender for future throttling is made, the message notification is suited for the sender. Thus, it should be understood that in one embodiment different senders can be given different throttling settings and different notification messages. In other embodiments, the system may apply default throttling settings and notification messages based on the activity of the sender with respect to the recipient.

Figure 12:
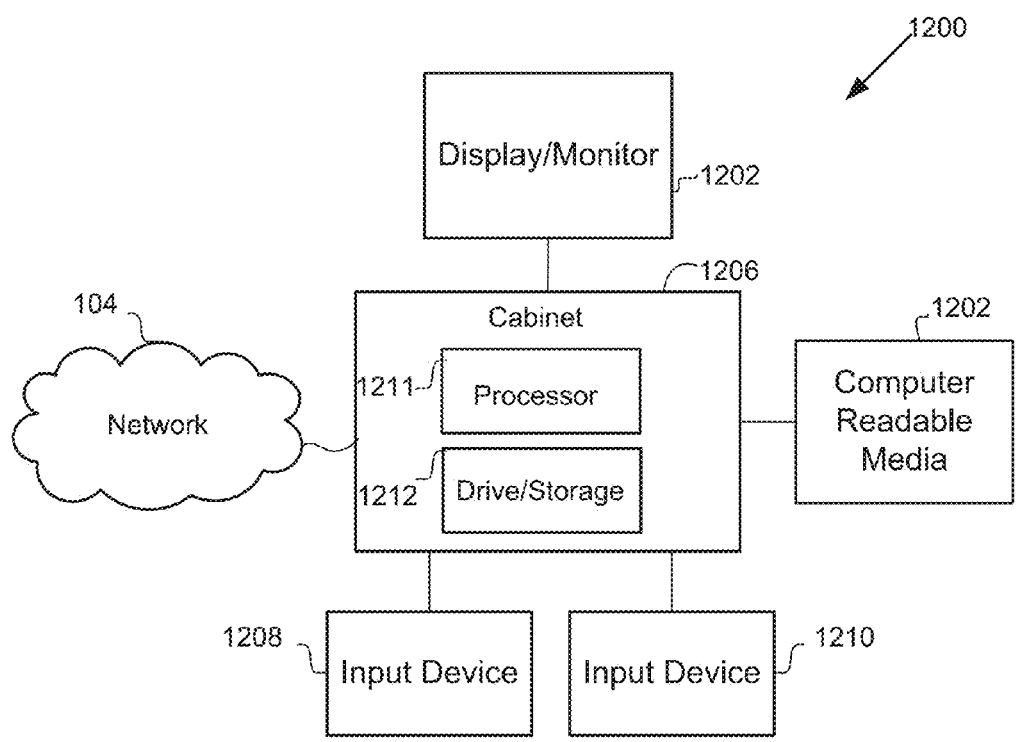
FIG. 12 shows an exemplary computer system.

FIG. 12 shows an exemplary computer system. One or more of the exemplary computer systems are suitable for use with at least one embodiment of the invention. The computer system 1200 includes a display/monitor 1202 having a single or multi-screen display, touch screen, (or multiple displays), a cabinet 1206, an input device 1208 (e.g., keyboard), input device 1210 (e.g., a mouse, input surface, buttons, speakers, controller, etc. The cabinet 1206 houses the computer system. The cabinet 1206 can, for example, be the casing of a smart phone, a laptop, a tablet, a desktop, etc. The cabinet 1206 can also house drive(s)/storage 1212 (e.g., such as a CD-ROM, system memory, and a mass storage device (e.g., hard drive or solid-state drive), etc.), which may be utilized to store retrievable software programs incorporating computer code that implements an embodiment of the invention, data for use with embodiment(s) of the invention, and the like. Other exemplary computer readable medium may include computer readable digital video, audio, including floppy disk, tape, flash memory, system memory, and hard drive may be utilized. The cabinet 1206 may also house a processor 1211, which is used to process operations for carrying out one or more operations described herein. The processor can also enable communication of data with a network 104. The network may be, for example, a local area network, a wide area network, or the Internet.

Additionally, U.S. patent application Ser. No. 14/985,124, entitled "NETWORK-BASED MESSAGING SYSTEM WITH DATABASE MANAGEMENT FOR COMPUTER BASED INTER-USER COMMUNICATION," and filed on Dec. 30, 2015, and which is hereby incorporated herein by reference.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for summarizing text messages, comprising:
receiving a series of text messages from a given sender over a period of time;
determining whether the text messages in the series of text messages have not been read; and
replacing the series of text messages with a summary message if the determining determines that the text messages in the series of text messages have not been read,
wherein the replacing the series of text messages with a summary message comprises:
producing, by a computing device, a proposed summary message;
initiating sending via text messaging, by the computing device, of the proposed summary message to the given sender for approval;
receiving approval of the proposed summary message or a replacement message from the given sender; and
thereafter using the proposed summary message or the replacement message as the summary message.

2. A computer-implemented method as recited in claim 1, wherein the summary message is condensed version of the series of text messages.

3. A computer-implemented method as recited in claim 1, wherein the summary message is automatically generated by the computing device by analyzing the series of text messages.

4. A computer-implemented method as recited in claim 1, wherein the replacement message is provided by the given sender.

5. A computer-implemented method as recited in claim 1, wherein the determining whether the text messages in the series of text messages have not been read comprises:
determining if a number of the text messages in the series of text messages that have not been read is greater than a predetermined number of the unread messages.

6. A computer-implemented method as recited in claim 1, wherein the determining whether the text messages in the series of text messages have not been read comprises:
determining if one or more of the text messages in the series of text messages have not been read for a duration greater than a predetermined duration of time.

7. A computer-implemented method as recited in claim 1, wherein the series of text messages are all delivered to a recipient via a mobile computing device associated with the recipient, the mobile computing device having a processor, memory and a display, and
wherein the series of text messages are displayed on the display, and
wherein the using the proposed summary message or the replacement message as the summary message comprises displaying the summary message on the display.

8. A non-transitory computer readable medium including at least computer program code for summarizing text messages, said computer readable medium comprising:
computer program code for receiving a series of text messages from a given sender over a period of time;
computer program code for determining whether the text messages in the series of text messages have not been read; and
computer program code for replacing the series of text messages with a summary message if the determining determines that the text messages in the series of text messages have not been read,
wherein the computer program code for replacing the series of text messages with a summary message comprises:
computer program code for producing, by a computing device, a proposed summary message;
computer program code for initiating sending via text messaging of the proposed summary message to the given sender for approval;
computer program code for receiving approval of the proposed summary message from the given sender;
computer program code for using the proposed summary message the summary message if the computer program code for receiving approval of the proposed summary message has received approval of the proposed summary message from the given sender.

9. A non-transitory computer readable medium as recited in claim 8, wherein the computer program code for determining whether the text messages in the series of text messages have not been read comprises:
computer program code for determining if a number of the text messages in the series of text messages that have not been read is greater than a predetermined number.

10. A non-transitory computer readable medium as recited in claim 8, wherein the computer program code for determining whether the text messages in the series of text messages have not been read comprises:
computer program code for determining if one or more of the text messages in the series of text messages have not been read for a duration greater than a predetermined duration of time.

11. A non-transitory computer readable medium as recited in claim 8, wherein the non-transitory computer readable medium comprises:
computer program code for initiating display of the one or more of the text messages in the series of text messages; and
computer program code for initiating removal of the display of the one or more of the text messages in the series of text messages if the summary message is to replace the text messages in the series of text messages.

12. A non-transitory computer readable medium as recited in claim 8, wherein the one or more of the text messages in the series of text messages are all for a recipient, and
wherein the non-transitory computer readable medium comprises:
computer program code for initiating display of the one or more of the text messages in the series of text messages; and
computer program code for subsequently initiating removal of the display of the one or more of the text messages in the series of text messages if the computer program code for determining determines that the text messages in the series of text messages have not been read.

13. A non-transitory computer readable medium as recited in claim 8, wherein the non-transitory computer readable medium comprises:
computer program code for receiving a replacement message from the given sender; and
computer program code for using the replacement message as the summary message if the computer program code for receiving has received the replacement message from the given sender.

14. A mobile computing device capable of supporting text message communications, said mobile computing device comprising:

a memory configured to store computer program code;

a processor operable to execute the computer program code, the computer program code including at least computer program code for receiving a series of text messages from a given sender over a period of time;

computer program code for determining whether the text messages in the series of text messages have not been read; and computer program code for replacing the series of text messages with a summary message if the determining determines that the text messages in the series of text messages have not been read; and a display for presenting the text messages and/or the summary message, wherein the computer program code for replacing the series of text messages with a summary message comprises:

computer program code for producing, by the processor or a remote computing device, a proposed summary message;

computer program code for initiating sending via text messaging, by the processor or the remote computing device, of the proposed summary message to the given sender for approval;

computer program code for receiving approval of the proposed summary message or a replacement message from the given sender; and computer program code for using the proposed summary message or the replacement message as the summary message.

15. A mobile computing device as recited in claim 14, wherein the mobile computing device is associated with a recipient, wherein the mobile computing device comprises a display, and wherein the computer program code for using the proposed summary message or the replacement message as the summary message comprises computer program for displaying the summary message on the display.

16. A mobile computing device as recited in claim 15, wherein the mobile computing device comprises a display, wherein the non-transitory computer readable medium comprises computer program code for displaying the series of text messages on the display, wherein the computer program code for using the proposed summary message or the replacement message as the summary message comprises computer program for displaying the summary message on the display after the series of text messages are displayed on the display, and wherein the non-transitory computer readable medium comprises computer program code for removing display of the series of text messages from the display following or concurrent with the displaying of the summary message on the display.

17. A system for providing message communications, said system comprising:

at least one hardware processor;

a sender processing module, performed by the at least one hardware processor, that receives a plurality of electronic messages from a sender to a recipient;

a summary module, performed by the at least one hardware processor, that detects a series of incoming electronic messages for the recipient, and condenses the series of incoming electronic messages to create a summary message; and a recipient processing module, performed by the at least one hardware processor, that initiates delivery of the summary message to the recipient where the summary message is presented in place of the series of incoming electronic messages, wherein the summary module produces, by a computing device, a proposed summary message; initiates sending via electronic messaging of the proposed summary message to the given sender for approval; receives approval of the proposed summary message or a replacement message from the given sender; and subsequently uses the proposed summary message or the replacement message as the summary message that is delivered to the recipient to be presented in place of the series of incoming electronic messages.

18. A system as recited in claim 17, wherein the summary module condenses the series of incoming electronic messages to create the summary message based on at least one rule.

19. A system as recited in claim 18, wherein the at least one rule is based on a number of electronic messages in the series of incoming electronic messages.

20. A system as recited in claim 18, wherein the series of incoming electronic messages are a sequential set of text messages.

* * * * *